US009626181B2

(12) United States Patent
Liu et al.

(10) Patent No.: US 9,626,181 B2
(45) Date of Patent: Apr. 18, 2017

(54) SYSTEMS AND METHODS TO SECURELY INJECT BINARY IMAGES AND CODE INTO FIRMWARE

(71) Applicants: Wei G. Liu, Austin, TX (US); James E. Dailey, Round Rock, TX (US); Mark W. Shutt, Austin, TX (US); Keungsik Kim, Round Rock, TX (US); Ganesh K. Viswanathan, Round Rock, TX (US)

(72) Inventors: Wei G. Liu, Austin, TX (US); James E. Dailey, Round Rock, TX (US); Mark W. Shutt, Austin, TX (US); Keungsik Kim, Round Rock, TX (US); Ganesh K. Viswanathan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 14/792,083

(22) Filed: Jul. 6, 2015

(65) Prior Publication Data

US 2017/0010884 A1     Jan. 12, 2017

(51) Int. Cl.
*G06F 9/44* (2006.01)
*G06F 9/445* (2006.01)
*G06F 21/57* (2013.01)

(52) U.S. Cl.
CPC .............. *G06F 8/67* (2013.01); *G06F 8/66* (2013.01); *G06F 8/665* (2013.01); *G06F 9/445* (2013.01); *G06F 21/57* (2013.01)

(58) Field of Classification Search
CPC ................ G06F 8/66; G06F 8/65; G06F 8/67

USPC ................................... 717/168–177; 709/203
See application file for complete search history.

(56) References Cited

U.S. PATENT DOCUMENTS

| | | | | |
|---|---|---|---|---|
| 6,606,744 B1 * | 8/2003 | Mikurak | ................. | H04L 29/06 717/174 |
| 7,035,955 B2 | 4/2006 | Bobbitt et al. | | |
| 7,360,211 B2 * | 4/2008 | Hyden | ................. | G06F 9/4411 709/215 |
| 8,161,463 B2 * | 4/2012 | Johnson | ................. | G06F 21/14 713/190 |
| 8,370,659 B2 | 2/2013 | Chiasson et al. | | |
| 8,429,641 B2 * | 4/2013 | O'Connor | ............. | G06F 15/173 717/168 |
| 8,468,516 B1 * | 6/2013 | Chen | ......................... | G06F 8/67 707/687 |
| 8,510,596 B1 * | 8/2013 | Gupta | ................... | G06F 11/073 714/15 |

(Continued)

OTHER PUBLICATIONS

Younan et al, "Runtime Countermeasures for Code Injection Attacks Against C and C+' Programs", ACM Computing Surveys, vol. 44, No. 3, Article 17, pp. 1-28, 2012.*

(Continued)

*Primary Examiner* — Anil Khatri
(74) *Attorney, Agent, or Firm* — Egan Peterman Enders Huston (57) ABSTRACT

Systems and methods are provided that may be implemented to execute firmware and to inject executable code images into the executing firmware that are extracted from a code injection module (CIM) so as to execute the injected code and/or binary images from the firmware implementation environment.

21 Claims, 2 Drawing Sheets

(56) References Cited

U.S. PATENT DOCUMENTS

| | | | | |
|---|---|---|---|---|
| 8,613,096 | B2* | 12/2013 | Peinado | G06F 21/577 |
| | | | | 726/25 |
| 8,832,369 | B2 | 9/2014 | Zhang et al. | |
| 8,875,125 | B2* | 10/2014 | Liles | G06F 8/60 |
| | | | | 717/174 |
| 8,924,956 | B2* | 12/2014 | Smith | G06F 9/445 |
| | | | | 717/176 |
| 8,954,953 | B2* | 2/2015 | Gala | G06F 8/63 |
| | | | | 717/168 |
| 8,984,478 | B2* | 3/2015 | Epstein | G06F 12/1475 |
| | | | | 717/110 |
| 9,015,839 | B2* | 4/2015 | Ibatullin | G06F 21/554 |
| | | | | 726/23 |
| 9,038,176 | B2* | 5/2015 | Sallam | G06F 21/554 |
| | | | | 718/1 |
| 9,208,328 | B2* | 12/2015 | Russello | G06F 21/60 |
| 2004/0193865 | A1 | 9/2004 | Nguyen et al. | |
| 2006/0190532 | A1 | 8/2006 | Chadalavada | |
| 2006/0212143 | A1 | 9/2006 | Nguyen et al. | |
| 2010/0011197 | A1 | 1/2010 | Harmer | |
| 2013/0007428 | A1 | 1/2013 | Khosrowpour et al. | |
| 2013/0111197 | A1 | 5/2013 | Nadon et al. | |

OTHER PUBLICATIONS

Nguyen et al, "A Framework for Diversifying Windows Native APIs to Tolerate Code Injection Attacks", ACM, pp. 392-394, 2007.*

Ren et al, "Scalable Image Search with Reliable Binary Code", ACM, pp. 769-772, 2014.*

Berg et al, "Firmware quality assurance", ACM, pp. 3-10, 1982.*

Hemel et al, "Finding Software License Violations Through Binary Code Clone Detection ", ACM, pp. 63-72, 2011.*

Berg, "Firmware testing and test data selection", ACM, pp. 75-80, 1981.*

Kim et al, "Allowing User-Specified Failure Handling in Web Services Composition", ACM, pp. 452-458, 2007.*

Maier et al, "Fault Injection at Host-Compiled Level with Static Fault Set Reduction for SoC Firmware Robustness Testing", ACM, pp. 1-10, 2016.*

Shabbir et al., "Systems and Methods for Power and Thermal Support of Information Handling Resources", U.S. Appl. No. 14/501,397, filed Sep. 30, 2014, 29 pgs.

Dell, OEM Identity Module Software Branding Program, Printed from Internet May 17, 2015, 2 pgs.

Wikipedia, "Hotfix", Printed From Internet May 17, 2015, 3 pgs.

NTDE Bug, "Windows Hotfixes and Updates-How Do They Work?", Oct. 2008, 5 pgs.

Technology Business Research, "Dell $12^{th}$ Generation Server OEM Identity Module Adds Value for Customers Through Customization", TBR Whitepaper, Nov. 2011, 7 pgs.

Technology Business Research, "Dell $12^{th}$ Generation Server OEM LCD Access Control Panel Adds Value for Customers Through Customization", TBR Whitepaper, Nov. 2011, 4 pgs.

HP, "HP Smart Update Solution", Technical White Paper, Jun. 2014, 17 pgs.

* cited by examiner

SYSTEMS AND METHODS TO SECURELY INJECT BINARY IMAGES AND CODE INTO FIRMWARE

FIELD OF THE INVENTION

This invention relates generally to information handling systems and, more particularly, to firmware for information handling system components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Personality modules ("PMs") are provided in the basic input output system (BIOS) domain for rebranding of a server system (e.g., to rebrand the same server system from a computer manufacturer's brand name to an original equipment manufacturer (OEM) search provider's brand name) and alter some of the server BIOS behaviors, such as the default boot order, the thermal algorithm, etc. The current implementation for such server rebranding is data driven, with the personality module presenting pre-defined flags and data (e.g., a high definition logo bitmap). The server system BIOS caches the information from the personality module in a section of a serial peripheral interface (SPI) chip when the personality module is applied, and uses it to alter the personality of the server in the following boots. The personality module can be loaded using a securely authenticated module using a service processor such as an Integrated Dell Remote Access Controller (iDRAC) available from Dell Products, LP of Round Rock, Tex. When implementing conventional Personality modules to rebrand a server system to an OEM, a new custom BIOS code must be created in order to alter existing BIOS behaviors to new BIOS behaviors for the OEM, or in order to replace existing pre-boot device drivers with different pre-boot device drivers for the OEM. Moreover, to address critical bugs a new official BIOS has to be released. For example, whenever there is microcode update from a processor manufacturer, the computer manufacturer must quickly release a corresponding BIOS update for existing deployed server systems that contains the new microcode, even if the deployed server system is approaching the end of its useful operating life.

In conventional methodology, drivers are either distributed to the OEMs in binary forms, or in source code form. The OEM then includes these modules in their BIOS build.

SUMMARY

Disclosed herein are systems and methods that in one embodiment may be implemented to inject executable code images (e.g., source code, compiled source code, and/or binary code images such as machine code without source code) into executing firmware such as BIOS or other firmware using a code injection module (CIM), and to execute the injected code and/or binary images from the firmware implementation environment (e.g., such as Unified Extensible Firmware Interface "UEFI" BIOS or firmware of other information handling system component/s). In one embodiment, such a CIM may be implemented as an OEM ID injection module (e.g., which may be a third party module). In a BIOS implementation case, the injected code of the code injection module may in one embodiment be executed as early as the Driver Execution Environment (DXE) phase. In another exemplary embodiment, the code injection module may be configured in a different manner than Option ROMs from add-in Peripheral Component Interconnect (PCI) cards or conventional out-of-band management controller functions, and may therefore be implemented to change boot behaviors and apply hot fixes. In this regard, a code injection module may be configured in one exemplary embodiment as an entity separate (and that compiles separately) from BIOS code but that is treated as internal UEFI BIOS code, e.g., that may be maintained by BIOS developers.

Examples of suitable injected code that may be employed in the disclosed systems and methods include executable code and/or sub-binary code in the firmware. In the exemplary embodiment case of BIOS, example injected code may include Management Engine/Innovation Engine (ME/IE) images, microcode, option ROM that is called by the system BIOS, UEFI drivers (e.g., such as third party UEFI drivers), or any other executable code. In one embodiment, the disclosed systems and methods may be employed as a service pack for an already-released firmware in the field to apply hot fixes without officially releasing a new firmware. In one exemplary BIOS embodiment, this may be especially useful since an OEM ID code injection module may be released after validation (e.g., as a third party service patch via OEM ID module infrastructure) independent of (and instead of) a full BIOS update when it is typically required to release a new BIOS update even after a given information handling system has reached its end of life, e.g., such as when a host processing device manufacturer has released a microcode update to address some virtualization bug or security vulnerability.

In one exemplary embodiment, the disclosed systems and methods may be implemented to eliminate the need of developing and releasing OEM BIOS or firmware for OEM customers, which can be a very costly process. In this regard, an OEM may rely on the standard existing server BIOS or firmware and avoid typical periodic BIOS release, since an OEM ID injection module (rather than a full update of BIOS or firmware) is all that is needed to change the behavior of the OEM server, e.g., such as when periodic BIOS releases are typically required after a generation of server has reached Ready To Ship (RTS). In another exemplary embodiment, the disclosed systems and methods may be implemented to potentially eliminate the need and cost associated with creating and releasing custom OEM BIO- Ses. For example, if an OEM wants to rebrand a computer manufacturer's server to their own (e.g., to change the BIOS boot behaviors that requires adding an OEM driver, or new code to the BIOS), an OEM ID injection module may be provided instead of creating and building a custom BIOS specifically for the OEM, in which case the server may continue using the standard existing server BIOS without replacement or upgrade. In any case, the disclosed systems and methods may be implemented in one exemplary embodiment to securely inject BIOS code and sub-binaries from an authenticated OEM ID injection module vehicle (e.g., third-party module vehicle) in a manner that is separate from and independent of the BIOS so as to reduce the number of required BIOS release cycles, and also to ease OEM/custom support. Thus, the BIOS and OEM ID injection module are two different entities, and may be released separately and at different times from each other.

In another exemplary embodiment, the disclosed systems and methods may be implemented using code injection module including a patch code that may include executable BIOS code, binaries such as third-partied binaries or other binaries, microcode, ME/IE firmware, etc. The disclosed systems and methods may also be applied to other system component firmware domains such as baseboard management controller (BMC) firmware, BMC hot fixes, BMC setup and remote settings, BMC vFlash, BMC diagnostic tools, as well as commodity binaries such as power supply unit (PSU) FW, complex programmable logic device (CPLD) firmware, PCI express (PCIe) switch read only memories (ROMs), backplane (e.g., active backplane) firmware, etc. Moreover, additional OEM ID injection module policy options may be offered, such as options of: 1) loading each binary or executable code on each boot/loading each binary or executable code into random access memory (RAM) (e.g., don't commit to ROM) to ease the re-provisioning of the system by just deleting the OEM ID injection module rather than also requiring re-flash of other code that is running OEM ID injection module-induced modifications/hybrid images; or 2) permanently committing binary or executable code of an OEM ID injection module to ROM (e.g., primary or an alternate ROM image such as if a power supply unit (PSU) had two images to boot from that each behave differently).

In one exemplary embodiment, a code injection module (e.g., OEM ID injection module) may contain one or more executable images (e.g., in the form of BIOS code, binaries such as third party binaries, microcodes, etc.) that may be loaded and executed in a pre-boot environment by BIOS. In one exemplary embodiment, the image may be optionally compressed in order to save storage space. The code injection module itself may be signed and authenticated when it is applied via a service processor such as an Integrated Dell Remote Access Controller (iDRAC) available from Dell Products, LP of Round Rock, Tex. However to further enhance security, the executable image may be optionally further signed via a signing infrastructure and authenticated by the BIOS that contains the public portion of the signing key. In example embodiments, such an executable image may be a UEFI DXE driver, or a driver that complies with the UEFI driver model, e.g., that supports the supported ( ), start ( ) and stop ( ) functions. In other embodiments, an executable image may be a binary module, such as processor microcode update, a Management Engine (ME) image, an Innovation Engine (IE) image, an PCI option ROM, etc.

In a further exemplary embodiment, a code injection module may be employed as an OEM ID injection module that is implemented as a service pack for BIOS, and additional BIOS code may be added at various points in the boot flow to invoke code from the OEM ID module executable. In some embodiments, these may be in the form of UEFI protocols or UEFI events. As an example, if a change or fix needs to be made after the PCI enumeration: 1) In one embodiment, at the end of the PCI enumeration, the BIOS may locate the protocol that is published by a patch code that was injected by OEM ID, and call it to effectively apply the change/hot fix; 2) In another embodiment, the OEM ID code may hook on a pre-defined event, and the BIOS may signal the event right after PCIe enumeration. A patch code in the form of event handler that was injected by OEM ID may then be executed, and it may make the necessary change/hot fix.

In one exemplary embodiment the disclosed systems and methods may be implemented to allow an OEM customer or other user to replace a default system BIOS driver/s for a device with a new driver (e.g., such as their own new driver) for the device by incorporating the new driver in the OEM ID code injection module. In such a case, the new driver/s may have a higher version than the default system BIOS driver, and/or may have a platform override, and/or a driver family override. This will ensure the new driver in the OEM ID injection module will be loaded first when BIOS connects drivers to the device handle. The BIOS may also add a dependency checking. Instead of implementing a patch driver that does not make any assumptions on the system status and verify everything before making changes, the BIOS may also add checking the minimum prerequisites, such as minimum supported base BIOS/firmware version, etc. This may be done, for example, to help the patch driver developers and testers. Moreover, the disclosed systems and methods may be so employed to replace runtime drivers (i.e., BIOS drivers still available after booting, e.g., in the OS) or non-runtime drivers (i.e., drivers only available in pre-boot operating condition before booting to the OS), and/or to add runtime or non-runtime drivers.

In another exemplary embodiment, the disclosed systems and methods may be implemented to allow an OEM customer or other user to alter the system BIOS behavior (e.g., to modify the system management BIOS (SMBIOS) table or add a new structure entry) by using the BIOS to call the protocol or signal an event after the SMBIOS tables are built in power-on-self-test (POST). Then the patch code injected by an OEM ID will be executed, and it may make the necessary changes. A personality module policy may be implemented in one embodiment to include options for: 1) loading the injected code on each boot in random access memory (RAM) so that it is applied on every boot which has the advantage of easing the re-provisioning of the system box by just deleting the OEM ID; or 2) by permanently committing the injected code to read only memory (ROM).

Thus, the disclosed systems and methods may be implemented to achieve a variety of different information handling system applications and environments. For example, the disclosed systems and methods may be employed in one embodiment from a firmware (e.g., BIOS) implementation to securely execute code or binary images that are injected by a code injection module (e.g., OEM ID injection module and/or third party code injection module) and, in the example of BIOS, the injected code may be executed as early as the DXE phase if desired. In this embodiment, the code injection module is different from option ROMs from an add-in PCI card or remote access controllers, as it is an entity that may be created, owned and maintained by BIOS developers and may be treated as internal BIOS code. It may therefore be allowed to change boot behaviors and apply hot fixes in a manner that is not possible with option ROMs. Besides being regular executable code, the injected code may in one embodiment be all sub-binaries and configurations in the firmware, e.g., in the BIOS example these sub-binaries may include management engine and innovation engine (ME/IE) images, microcode, option ROMs, UEFI drivers (e.g., third-party UEFI drivers), etc.

In one embodiment, the disclosed systems and methods may be implemented as a service pack for an already-released firmware in the field to apply hot fixes without officially releasing a new firmware. In the BIOS example, this is especially useful when a full BIOS update is desired or needed even after a given information handling system has reached its end of life. For example, if a host processing device (e.g., central processing unit "CPU") manufacturer has released a microcode update to address some virtualization bug or security volubility, the system manufacturer or OEM only needs to release a code injection module (e.g., OEM ID injection module) as a service patch instead of a full BIOS update. The disclosed systems and methods may also be implemented in one embodiment to eliminate the need of developing and release OEM BIOSes or firmware/s for OEM customers, e.g., such as an emergent web post release, or an IPS release. In this regard, the OEM may use the standard information handling system (e.g., server) BIOS or firmware, and the OEM ID code injection module is all that it is needed to change the behavior of the OEM server to meet the needs of the OEM.

In one respect, disclosed herein is an information handling system, including: at least one non-volatile memory storage device storing firmware and a code injection module (CIM) that is separate and independent from the firmware, the CIM including one or more executable images; and at least one processing device communicatively coupled to the non-volatile storage device, the processing device being configured to retrieve the firmware from the storage device and to execute the retrieved firmware. The processing device may be further configured to execute the retrieved firmware to extract one or more executable code images from the CIM and to execute the extracted executable code images together with the retrieved firmware.

In another respect, disclosed herein is a method for executing firmware on an information handling system. The method may include using at least one processing device of the information handling system to: retrieve firmware from at least one first non-volatile memory storage device of the information handling system; execute the retrieved firmware to extract one or more executable code images from a code injection module (CIM) that is separate and independent from the firmware; and execute the extracted executable code images together with the retrieved firmware.

DESCRIPTION OF ILLUSTRATIVE EMBODIMENTS

Figure 1:
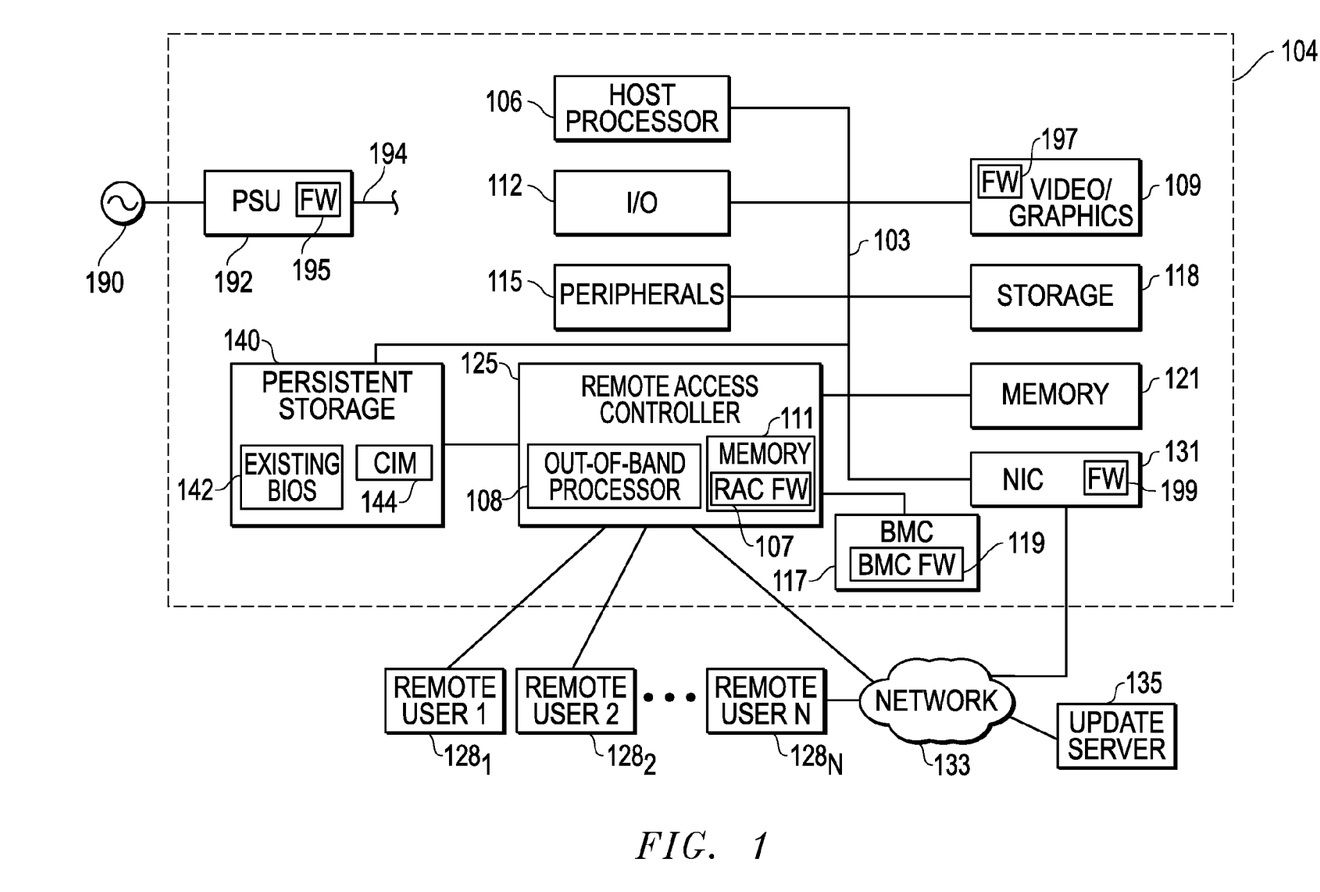
FIG. 1 illustrates a block diagram of an information handling system according one exemplary embodiment of the disclosed systems and methods.

FIG. 1 is a block diagram of an information handling system 104 as it may be configured according to one exemplary embodiment. As shown, system 104 may include at least one host processing device 106 (e.g., AMD or Intel-based CPU or any other type of suitable host processing device), one or more buses or communication media 103, video/graphics hardware (e.g., video adapter or graphics processor unit) 109 (with video/graphics component firmware 197), storage 118, system volatile memory 121, local input/output (I/O) 112, peripherals 115, and remote access controller (RAC) 125 having one or more out-of-band processing devices 108 and memory 111 that stores remote access controller component firmware 107. Examples of remote access controller 125 include an integrated Dell Remote Access Controller (iDRAC) available from Dell Products L.P. of Round Rock, Tex., etc.). As shown in the exemplary embodiment of FIG. 1, out-of-band processing device 108 is a separate and independent processing device from any in-band host central processing unit (CPU) such as host processing device 106 that runs system BIOS and host OS. In this regard, out-of-band processing device 108 may operate without management of BIOS or any application executing with a host OS on the host CPU.

Bus 103 provides a mechanism for the various components of system 104 to communicate and couple with one another. Host processing device 106 may be an in-band processing device configured to run a host operating system (OS), and out-of-band processing device 108 of remote access controller 125 may be a service processor, embedded processor, etc. Video/graphics 109, storage 118, memory 121, I/O 112 and peripherals 115 may have the structure, and perform the functions known to those of skill in the art. Besides volatile memory 121 (e.g., random access memory "RAM"), processor 106 may include cache memory for storage of frequently accessed data, and storage 118 may include extended memory for processing device 106. Information handling system 104 may also include a network access card (NIC) 131 (with its component firmware 199) that is communicatively coupled to network 133 (e.g., Internet or corporate intranet) as shown to allow various components of system 104 to communicate with external and/or remote devices (e.g., such as update server 135) across network 133. In this embodiment, information handling system 104 also includes power supply unit (PSU) 192 (including PSU component firmware 195) that is coupled to receive power from AC mains 190 and to perform appropriate power conversion and voltage regulation to produce regulated internal power 194 for use by other power-consuming components of system 104.

Still referring to FIG. 1, remote access controller 125 is coupled to persistent non-volatile memory storage 140 (e.g., embedded and partitioned flash memory, Electrically Erasable Programmable Read Only Memory—EEPROM, other types of non-volatile random access memory "NVRAM", etc.) that is configured to store persistent information for remote access controller 125 and information for other system components, e.g., including Unified Extensible Firmware Interface (UEFI) firmware; Advanced Configuration and Power Interface (ACPI) information, system BIOS firmware (e.g., in the form of system management SMBIOS data), etc. It will be understood that system persistent storage 140 may be implemented by one or more non-volatile memory storage devices and that in other embodiments, non-volatile memory or other non-volatile memory storage device/s (e.g., such as hard disk drive and/or optical drive, etc.) may also or alternatively be provided elsewhere in system 104 for storing such information, e.g., such as media drives of storage 118. In this embodiment, system 104 also includes a baseboard management controller (BMC) 117 that is communicatively coupled to remote access controller 125 as shown. BMC 117 includes integrated non-volatile memory 119 for storing BMC component firmware 119 for execution by BMC 117. As shown, in the embodiment of FIG. 1 remote access controller 125 optionally may provide access to a plurality of remote users 1281-128N, although access may be provided to a single user 128 in other embodiments. In this regard, remote access controller 125 may be configured to allow remote users to manage, administer, use, and/or access various resources of host system 104 (e.g., either native or virtual) from a remote location, e.g., via network 133 and/or other suitable communication media.

In the embodiment of FIG. 1, persistent storage 140 is storing existing system BIOS code 142 and is further configured as shown to receive and store a code injection module (CIM) 144, e.g., that may be provided as data to system 104 by remote update server 135 across network 133. In this embodiment, BIOS 142 and CIM 144 are two different independent entities, and may in one embodiment each be released separately and saved in storage 140 at different times from each other, although it is also possible that BIOS 142 and CIM 144 may be saved in storage 140 at the same time, e.g., such as at time of system assembly. In one exemplary embodiment BIOS 142 may be an original system BIOS code (e.g., UEFI or legacy BIOS code) that was originally saved in storage 140 at a factory or assembly plant during manufacture of system 140, while CIM 144 is provided to storage 140 across network 133 after system 104 has been deployed in the field to a user, e.g., such as a service pack for an already-released and stored firmware or BIOS in the field to apply hot fixes without officially releasing a new firmware. CIM 144 may include executable code, sub-binary code, etc. Specific examples of types of content within CIM 144 include, but are not limited to, ME/IE images, microcode, option ROM that is called by the system BIOS, UEFI drivers (e.g., third party UEFI drivers), etc.

In one exemplary embodiment, CIM 144 may be provided to remote access controller 125 over network 133 (e.g., from remote update server 135) and, for example, stored in remote access controller memory 111. During each power-on-system-test (POST), BIOS may query remote access controller 125 to determine if there is a pending CIM 144 such as an OEM injection module including an OEM ID update. Such a pending CIM 144 is a new or unapplied CIM that is not yet stored in persistent storage 140. If there is such a pending CIM 144 found, remote access controller 125 will then expose a USB partition to the host (BIOS 142 executing on host processor 106). BIOS 142 then copies the CIM 144 users from remote access controller 125 (via USB partition), and then writes it to persistent storage 140.

In a further exemplary embodiment, CIM 144 may be first provided and stored as data in storage 140 as shown in FIG. 1 and, for example, as described in the embodiment above. BIOS 142 then may access CIM 144 (e.g., on system boot) and extract patch code (e.g., BIOS code, drivers such as third party drivers, microcode, ME/IE firmware, etc.) from CIM 144. BIOS 142 may then permanently store the extracted patch code in a dedicated memory space (e.g., ROM) of storage 140 and become a permanent part of the image of the existing BIOS 142 (rather than just for a given boot session). However, it will be understood that in another exemplary embodiment, patch code extracted from CIM 144 may be loaded by BIOS 142 on each system boot into system memory 121 (e.g., RAM) and only retained for that given boot session. In the latter case, patch code of CIM 144 may be easily replaced with another different patch code version (e.g., including different and/or revised code components) for use with existing BIOS 142 during the next boot session, or with no patch code for the next boot session (in which case existing BIOS 142 will return to its original feature configuration). In another embodiment, patch code extracted from a given version of CIM 144 may be extracted on every reboot unless dictated differently later either by newer BIOS version or newer version of CIM 144.

In one embodiment, information handling system 104 may be a server system and CIM 144 may be configured as an OEM ID injection module that is configured to rebrand the server system 104 (e.g., to insert or rebrand the server system 104 from a computer manufacturer's brand name to an OEM search provider's brand name) and/or alter one or more of the server BIOS behaviors (e.g., such as altering the default boot order, altering the thermal algorithm behavior, suppressing features such as changing or turning off security settings, etc.) without changing or altering the stored code of BIOS 142.

It will be understood that CIM 144 may contain code for injection and application with types of firmware other than system BIOS 142. For example CIM 144 may include injection code for use with BMC 117, e.g., such as injection code to be applied to BMC firmware 119 or BMC SPI read only memory (ROM), as well as BMC hot fixes, BMC setup and remote settings, BMC vFlash, BMC diagnostic tools (e.g., load add-ons like customer scripting environment not part of base firmware), etc. Additionally, CIM 144 may include code for injection and use with other binaries such as firmware for other components of an information handling system, e.g., remote access controller (RAC) firmware 119 and firmware for voltage regulator (VR) or PSU 192, NIC 131, video processing device 109, as well as complex programmable logic device (CPLD) firmware, PCI express (PCIe) switch read only memories (ROMs), backplane firmware, display (e.g., LCD, LED) firmware, RAID controller firmware, etc. In one exemplary embodiment, CIM 144 may be provided as an OEM injection module that is saved and stored separate and independent from system BIOS 142, but to implement the same type of changes in system functionality (but in a different way) as conventional personality modules such as described in United States Patent Application publications 2013/0007428 and 2013/0111197, each of which is incorporated herein by reference in its entirety for all purposes.

Further information on RAID controller circuits may be found, for example, in United States patent application Ser. No. 12/586,368, filed on Sep. 21, 2009; and in United States patent application Ser. No. 12/925,673, filed on Oct. 27, 2010; each of which are incorporated herein by reference in its entirety for all purposes. Further information on remote access controllers may be found, for example, in United States Patent Application Publication Number 2006/0212143 and United States Patent Application Publication Number 2006/0190532, each of which is incorporated herein by reference in its entirety.

It will be understood that the embodiment of FIG. 1 is exemplary only, and that an information handling system may be provided with one or more processing devices that may perform the functions of host processing device 106, out-of-band processing device 108, etc. Examples of such processing devices include, but are not limited to, central processing units (CPUs), embedded controllers, microcontrollers, application specific integrated circuits (ASICs), field programmable gate arrays (FPGAs), etc. It will also be understood that the particular configuration of FIG. 1 is exemplary only, and that other information handling system architectures may be employed in the practice of the disclosed systems and methods.

Figure 2:
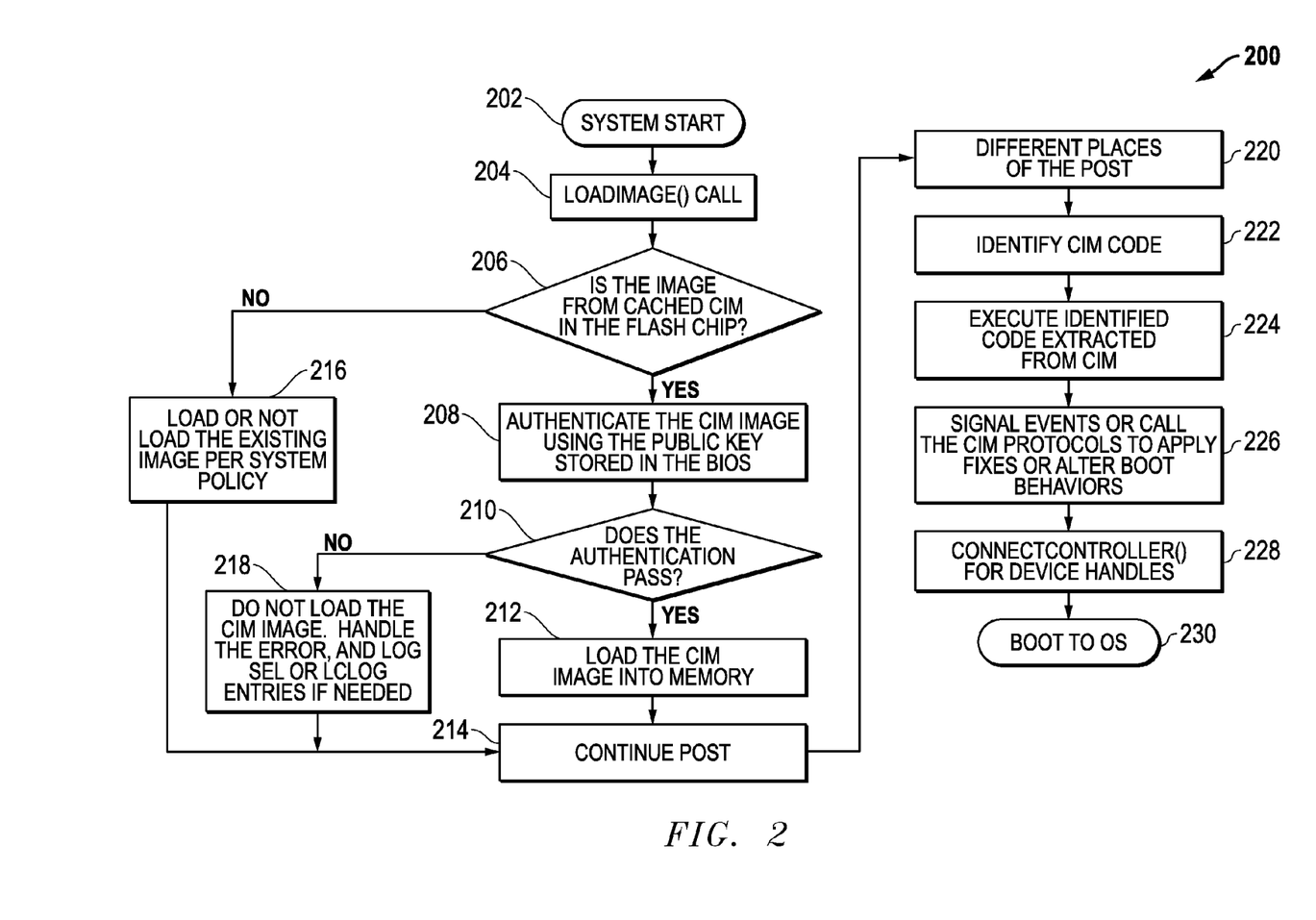
FIG. 2 illustrates methodology according one exemplary embodiment of the disclosed systems and methods.

FIG. 2 illustrates one exemplary embodiment of methodology 200 that may be implemented, e.g., by single-threaded UEFI BIOS executed on host processing device 106 of system 104. The steps of methodology 200 may be implemented separately for each individual executable hardware driver or other code image component (e.g., patch code including executable BIOS code, binaries (e.g., third-partied binaries), microcode, microcode, ME/IE firmware, etc.) that is called by BIOS 142. As shown, methodology 200 starts in step 202 with system startup (e.g., system power-on or restart), and proceeds to LoadImage( ) call in step 204 of power-on-self-test (POST) where a given particular individual executable hardware driver or other code image component (e.g., patch code including executable BIOS code, binaries (e.g., third-partied binaries), microcode, microcode, ME/IE firmware, etc.) are called by BIOS 142. Methodology 200 then proceeds to step 206 for each individual called image component (e.g., driver) from step 204. BIOS 142 is configured to first determine in step 206 if the individual component of the called image from step 204 is present in a cached code injection module 144 (e.g., OEM ID injection module) that is separate and independent from BIOS 142, and that is present on storage 140 or other suitable cached location known to BIOS 142. In one exemplary embodiment, BIOS 142 may be configured to recognize the presence of individual BIOS code images that are present in stored CIM 144 in order to make the determination of step 206 for each of the individual called components (e.g., drivers). If in step 206, BIOS 142 determines that a given individual component of the called image is not present in a CIM 144, then methodology 200 proceeds to step 216 where BIOS 142 proceeds with loading or not loading the given called image component (e.g., driver) from the existing image of BIOS 142 depending on system policy (e.g., such as applying the standard default boot sequence), before continuing with POST in step 214.

Still referring to FIG. 2, if BIOS 142 determines in step 206 that a given individual component (e.g., driver) of the called image is present in a CIM module 144, then methodology 200 proceeds to step 208 where BIOS 142 proceeds with authenticating the given individual component of the called CIM image, e.g., using a public key that is stored in the BIOS 144. If the BIOS 142 determines in step 210 that the CIM image authentication has not passed in step 210, then methodology 200 proceeds to step 218 where the given individual component of the called CIM image is not loaded, and the resulting error is handled (e.g., together with creation of any needed system event log (SEL) or other type error log that the given individual component of the called CIM image is not being loaded), before continuing with POST in step 214. However, if BIOS 142 determines in step 210 that the CIM image authentication has passed for a given individual component of the called CIM image in step 210, then methodology 200 proceeds to step 212 where the given individual component of the called CIM image is loaded into system memory 121 before continuing with POST in step 214. It will be understood that multiple policy options may be offered in one embodiment for loading images of CIM 144, and a given one of the policy options may be selected by an indicator or flag set in the loaded CIM 144. Examples of such multiple options include: 1) loading each binary or executable code from CIM 144 into system memory 121; and 2) permanently committing binary or executable code of CIM 144 to persistent storage 140.

From step 214, methodology 200 proceeds to step 220 where different places of the POST are executed by BIOS 142, depending on the particular identity and/or feature/s of a given individual component of a called CIM image. At step 222, BIOS 142 may analyze the loaded CIM image of step 212 to identify CIM code (e.g., patch code including executable BIOS code, binaries (e.g., third-partied binaries), microcode, microcode, ME/IE firmware, etc.) that has been extracted and loaded from CIM 144 by BIOS in step 212. In this regard, extracted code loaded from CIM 144 may include BIOS hooks or any other suitable identifier information to identify itself as injected code to BIOS 142 in step 222. Next, in step 224, BIOS 142 may execute a given identified individual loaded CIM code component (e.g., particular patch code component) in lieu of (i.e., in place of) the corresponding code component of the existing BIOS 142, but without replacing or altering the existing corresponding code component of the existing BIOS 142 stored in storage 142. In one exemplary embodiment, step 224 may be performed as "init" code that installs application programming interfaces (APIs). Examples of particular identified CIM components that may be executed by BIOS 142 instead of the corresponding existing BIOS components include, but are not limited to, replacing the PCI enumeration algorithm, replacing the boot enumeration algorithm, etc. It will be understood that BIOS 142 executes remaining existing components of BIOS 142 that do not have corresponding CIM components identified in step 222.

Still referring to methodology 200 of FIG. 2, BIOS 142 may next signal events or otherwise call the CIM code protocols of the identified and executed CIM patch code in step 226, e.g., to apply fixes or alter boot behaviors. Such signal events may be, for example, BIOS hooks that identify to the CIM patch code of step 224 the correct time to the CIM patch code In one exemplary embodiment, step 226 may be performed by using those APIs installed in step 224. It will be understood that any other technique or methodology may be performed by BIOS 142 in step 226 that is suitable for triggering protocol of the identified CIM patch code.

Next, in step 228, BIOS 142 may perform the UEFI function of connecting controllers for device handles. Among other things, in step 228, BIOS 142 may determine which drivers have higher priority, determine load order sequence, and initialize and connect drivers that support binding protocol. In particular, drivers from code of CIM 144 may be loaded first for a given device or class of devices if they are higher priority than the existing drivers of BIOS 142 for the same given device or class of devices. After step 228, BIOS 142 may boot to the operating system (OS) in step 230.

It will be understood that particular illustrated steps of methodology 200 are exemplary only, and that any other combination of additional, fewer and/or alternative steps may be employed that is suitable for executing firmware together with code images (e.g., in the form of source code and/or binary images) extracted from a CIM from the firmware implementation environment.

It will also be understood that one or more of the tasks, functions, or methodologies described herein (e.g., including those described herein for components 106, 108, 109, 117, 131, 192, 192, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. In one exemplary embodiment, such a processing device of the information handling system may be selected from the group consisting of a CPU, controller, microcontroller, processor, microprocessor, FPGA, and ASIC. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
    at least one non-volatile memory storage device storing firmware and a code injection module (CIM) that is separate and independent from the firmware, the CIM including one or more executable images; and
    at least one processing device communicatively coupled to the non-volatile storage device, the processing device being configured to retrieve the firmware from the storage device and to execute the retrieved firmware;
    where the processing device is further configured to execute the retrieved firmware to extract one or more executable code images from the CIM and to execute the extracted executable code images together with the retrieved firmware; and
    where the processing device is further configured to:
    receive and store the CIM module on the at least one non-volatile storage device of the information handling system when the non-volatile storage device is already storing a separate pre-existing firmware,
    then retrieve the pre-existing firmware as the retrieved firmware from the at least one non-volatile storage device of the information handling system,
    then execute the retrieved pre-existing firmware to extract one or more executable code images from the CIM, and
    then execute the extracted executable code images together with the retrieved firmware;
    where the executable code images of the CIM includes source code and/or binary images.

2. The system of claim 1, where the firmware comprises Unified Extensible Firmware Interface (UEFI) basic input output system (BIOS) code.

3. The system of claim 1, where the firmware comprises system BIOS code; and where the extracted executable code images of the CIM include extracted CIM BIOS code that is configured to alter the system BIOS behavior when the extracted CIM BIOS code is executed together with the system BIOS code by the processing device.

4. The system of claim 1, where the information handling system comprises at least one additional system component coupled to the at least one processing device; where the firmware comprises separate component firmware that is not system BIOS and that is stored on a storage device of the information handling system, the separate component firmware being configured to be used with the at least one additional system component.

5. The system of claim 4, where the at least one additional system component comprises at least one of a baseboard management controller (BMC), power supply unit (PSU), video adapter or graphics processor unit, network interface card (NIC), or remote access controller (RAC).

6. The system of claim 1, further comprising system volatile memory coupled to the at least one processing device; and where the at least one processing device is further configured to:
    extract the one or more executable code images from the CIM and temporarily store the extracted executable code images on the system volatile memory; and
    then execute the extracted executable code images from the system volatile memory together with the retrieved firmware.

7. The system of claim 1, where the at least one processing device is further configured to:
    extract the one or more executable code images from the CIM and permanently store the extracted executable code images on the at least one non-volatile storage device; and
    execute the extracted executable code images from the non-volatile storage device together with the retrieved firmware.

8. The system of claim 1, where the one or more executable images of the CIM are compiled separately from different source code than the firmware.

9. An information handling system, comprising:
    at least one non-volatile memory storage device storing firmware and a code injection module (CIM) that is separate and independent from the firmware, the CIM including one or more executable images; and at least one processing device communicatively coupled to the non-volatile storage device, the processing device being configured to retrieve the firmware from the storage device and to execute the retrieved firmware;

where the processing device is further configured to execute the retrieved firmware to extract one or more executable code images from the CIM and to execute the extracted executable code images together with the retrieved firmware; and where the firmware includes at least one device driver having a first priority; where the one or more executable code images from the CIM include at least one device driver having a second priority; and where the at least one processing device is further configured to:

determine the relative priority of the device driver of the CIM executable code images relative to the priority of the device driver of the firmware; and then load a determined one of either the device driver of the CIM executable code images or the device driver of the firmware that has the determined higher priority before loading the determined either one of the device driver of the CIM executable code images or the device driver of the firmware that has the determined lower priority;

where the executable code images of the CIM includes source code and/or binary images.

10. An information handling system, comprising:

at least one non-volatile memory storage device storing firmware and a code injection module (CIM) that is separate and independent from the firmware, the CIM including one or more executable images; and at least one processing device communicatively coupled to the non-volatile storage device, the processing device being configured to retrieve the firmware from the storage device and to execute the retrieved firmware;

where the processing device is further configured to execute the retrieved firmware to extract one or more executable code images from the CIM and to execute the extracted executable code images together with the retrieved firmware; and where the retrieved firmware comprises retrieved pre-existing firmware; and where the at least one processing device is further configured to determine the presence or absence of a CIM stored on the non-volatile storage device; and then either:

if the CIM is determined not to be stored on the non-volatile storage then execute the retrieved pre-existing firmware in a manner that implements a default behavior of the retrieved pre-existing firmware; or if the CIM firmware is determined to be stored on the nonvolatile storage then execute the retrieved pre-existing firmware to extract one or more executable code images from the CIM and then execute the extracted executable code images together with the retrieved firmware in a manner that implements an altered behavior of the retrieved pre-existing firmware from the default behavior exhibited by the retrieved pre-existing firmware when the retrieved pre-existing firmware is executed without the extracted CIM code images where the executable code images of the CIM includes source code and/or binary images.

11. A method for executing firmware on an information handling system, the method comprising using at least one processing device of the information handling system to:

retrieve firmware from at least one first non-volatile memory storage device of the information handling system;

execute the retrieved firmware to extract one or more executable code images from a code injection module (CIM) that is separate and independent from the firmware; and execute the extracted executable code images together with the retrieved firmware;

where the existing firmware includes at least one device driver having a first priority;

where the one or more executable code images from the CIM include at least one device driver having a second priority; and where the method further comprises using the at least one processing device to:

determine the relative priority of the device driver of the CIM executable code images relative to the priority of the device driver of the existing firmware, and then load a determined one of either the device driver of the CIM executable code images or the device driver of the existing firmware that has the determined higher priority before loading the determined either one of the device driver of the CIM executable code images or the device driver of the existing firmware that has the determined lower priority.

12. A method for executing firmware on an information handling system, the method comprising using at least one processing device of the information handling system to:

retrieve firmware from at least one first non-volatile memory storage device of the information handling system;

execute the retrieved firmware to extract one or more executable code images from a code injection module (CIM) that is separate and independent from the firmware; and execute the extracted executable code images together with the retrieved firmware;

where the method further comprises using the at least one processing device to:

receive and store the CIM module on the at least one non-volatile storage device of the information handling system when the non-volatile storage device is already storing a separate pre-existing firmware, then retrieve the pre-existing firmware as the retrieved firmware from the at least one non-volatile storage device of the information handling system, then execute the retrieved pre-existing firmware to extract one or more executable code images from the CIM, and then execute the extracted executable code images together with the retrieved firmware.

13. The method of claim 12, where the retrieved firmware comprises system BIOS code and the extracted executable code images of the CIM include extracted CIM BIOS code; and where the method further comprises using the at least one processing device of the information handling system to execute the extracted CIM BIOS code together with the retrieved BIOS firmware in a manner such that the extracted CIM BIOS code alters the system BIOS behavior from a behavior exhibited by the system BIOS when the retrieved BIOS firmware is executed without the extracted CIM BIOS code.

14. The method of claim 12, where the information handling system comprises at least one additional system component coupled to the at least one processing device; where the retrieved firmware comprises separate component firmware that is not system BIOS and that is stored on a storage device of the information handling system for use with the at least one additional system component; and where the method further comprises using the at least one processing device of the information handling system to execute the extracted executable code images with the separate component firmware.

15. The method of claim 14, where the at least one additional system component comprises at least one of a baseboard management controller (BMC), power supply unit (PSU), video adapter or graphics processor unit, network interface card (NIC), or remote access controller (RAC).

16. The method of claim 12, further comprising system volatile memory coupled to the at least one processing device; and where the method further comprises using the at least one processing device to:
 extract the one or more executable code images from the CIM and temporarily store the extracted executable code images on the system volatile memory; and
 then execute the extracted executable code images from the system volatile memory together with the retrieved firmware.

17. The method of claim 12, further comprising using the at least one processing device to:
 extract the one or more executable code images from the CIM and permanently store the extracted executable code images on the at least one first non-volatile storage device; and
 execute the extracted executable code images from the first non-volatile storage device together with the retrieved firmware.

18. The method of claim 12, further comprising compiling the one or more executable images of the CIM separately and from a different source code than the existing firmware.

19. The method of claim 12, further comprising using at least one processing device of the information handling system to determine the presence or absence of a CIM stored on the non-volatile storage device; and then either:
 if the CIM is determined not to be stored on the non-volatile storage then execute the retrieved pre-existing firmware in a manner that implements a default behavior of the retrieved pre-existing firmware; or
 if the CIM is determined to be stored on the non-volatile storage then execute the retrieved pre-existing firmware to extract one or more executable code images from the CIM and then execute the extracted executable code images together with the retrieved firmware in a manner that implements an altered behavior of the retrieved pre-existing firmware from the default behavior exhibited by the retrieved pre-existing firmware when the retrieved pre-existing firmware is executed without the extracted CIM code images.

20. A method for executing firmware on an information handling system, the method comprising using at least one processing device of the information handling system to:
 retrieve firmware from at least one first non-volatile memory storage device of the information handling system;
 execute the retrieved firmware to extract one or more executable code images from a code injection module (CIM) that is separate and independent from the firmware; and
 execute the extracted executable code images together with the retrieved firmware;
 where the firmware is pre-existing firmware that comprises system BIOS code on a field-deployed information handling system; where the CIM module comprises patch code provided on a network coupled to the information handling system; and where the method further comprises using the at least one processing device to:
  receive the CIM module as the patch code from across the network when the non-volatile storage device is already storing the separate pre-existing firmware,
  then retrieve the pre-existing firmware as the retrieved firmware from the at least one non-volatile storage device of the information handling system;
  then execute the retrieved pre-existing firmware to extract one or more executable code images from the CIM, and
  then execute the extracted executable code images together with the retrieved firmware.

21. A method for executing firmware on an information handling system, the method comprising using at least one processing device of the information handling system to:
 retrieve firmware from at least one first non-volatile memory storage device of the information handling system;
 execute the retrieved firmware to extract one or more executable code images from a code injection module (CIM) that is separate and independent from the firmware; and
 execute the extracted executable code images together with the retrieved firmware;
 where the information handling system comprises at least one in-band processing device and at least one out-of-band processing device that is coupled to an external network and to at least one second non-volatile memory storage device that is different from the first non-volatile memory storage device; and where the method further comprises:
  using the out-band-processing device to receive the CIM across the network from an external and/or remote device,
  then using the out-band-processing device to store the received CIM on the non-volatile memory storage device,
  then using the in-band processing device to communicate the presence of the received CIM to the in-band processing device,
  then using the in-band processing device to extract the one or more executable code images from the CIM and permanently store the extracted executable code images on the at least one first non-volatile storage device, and
  then using the in-band processing device to execute the extracted executable code images from the first non-volatile storage device together with the retrieved firmware.

* * * * *